Dec. 6, 1966 S. BERTRAM 3,290,506
PHOTOELECTRIC OBJECT TRACKING SYSTEM USING SIGNAL
DELAY AND MULTIPLYING CORRELATORS
Filed Dec. 28, 1962 4 Sheets-Sheet 1

SIDNEY BERTRAM
INVENTOR.

BY
Benjamin DeWitt
ATTORNEY

Fig. 2

SIDNEY BERTRAM
INVENTOR.

Fig. 4

SIDNEY BERTRAM
INVENTOR.

SIDNEY BERTRAM
INVENTOR.

United States Patent Office 3,290,506
Patented Dec. 6, 1966

3,290,506
PHOTOELECTRIC OBJECT TRACKING SYSTEM USING SIGNAL DELAY AND MULTIPLYING CORRELATORS
Sidney Bertram, Los Angeles, Calif., assignor, by mesne assignments, to TRW Inc., a corporation of Ohio
Filed Dec. 28, 1962, Ser. No. 247,944
13 Claims. (Cl. 250—203)

The present invention relates to object tracking systems for observing relative motion in a field of view and more particularly to systems for observing such motion and compensating for the same by automatic control of the look angle of the viewing mechanism or the orientation angle of a vehicle which may carry the viewing mechanism. The present invention has important advantages over prior art viewing systems which operate in response to visible light; however, it is not limited to the use of radiation in the visible spectrum but it is useful in any system which responds to electromagnetic radiation of a type which is detectable by known photocells or other radiation detectors of reasonable sensitivity.

There are a number of fields of technology, superficially unrelated, which in one way or another require review of large quantities of data to eliminate redundancies and to detect portions of the data which are different in one way or another from a prescribed reference body of data. The art of navigation by observation and recognition is one such field. If a person has previously been at a specific geographical location, he can, upon returning thereto, recognize distinguishing characteristics and landmarks. A pilot may observe and recognize his geographic position by comparison of observed terrain characteristics with mentally stored data concerning the terrain. In the case where the particular terrain area is new to him, he frequently establishes his position by the mental process of comparing observed characteristics of the terrain with data which has been accumulated by others in the form of maps, charts and photographs. That navigation technique, as mentally practiced, is perhaps the oldest and most universally employed. When automatic navigation or guidance of a plane, missile or spacecraft is contemplated, the human sensors and neurological data comparison mechanisms normally used for observation and recognition of landmarks must be replaced by less expensive and more expendable apparatus capable of (1) observing a field of view, (2) generating signals representative thereof, and (3) automatically comparing the observed field of view with a mechanically stored memory of the area over which the vehicle should fly or the particular object within the field of view upon which the viewing system should be trained. Observation of a field of view can be accomplished by sensors operating in the visible light spectrum, the infrared region, or in the radio frequency spectrum (suitable radar apparatus). Regardless of the type of radiation sensed, the information derived can be displayed as a picture for purposes of comparative recognition, or more directly, video signals obtained from the sensing mechanism may be directly compared with reference signals derived from a "memory" which contains mechanically stored data. The general philosophy of automatic control or guidance through recognition by comparison techniques has application in many arts of which a few are the following: geophysical surveying; aerial reconnaissance; guided missile navigation and homing; celestial navigation of spacecraft; and marine and armored vehicle fire control systems (target tracking). In general, any and all uses of the novel concepts and apparatus disclosed herein for detection and tracking of objects which have a relative motion within a selected field of view or with respect to the viewing system are considered to be within the scope of the present invention.

One application of the apparatus of the present invention is found in systems for use by space vehicles for rendezvousing with either friendly or alien spacecraft. In rendezvous missions some type of sensing system is required to search for and acquire targets and supply range rate information during transfer of the vehicle from its parking orbit into the orbit of the rendezvous target. Additionally, such a sensing system may be used to supply both angle and range rate information to the vehicle guidance systems during short range closing on the rendezvous target. To achieve orbital rendezvous it is generally considered necessary that sensing systems provide range rate information from a maximum rate of 400 feet per second down to about 0.5 feet per second with accuracies of 2 to 3 percent. Angular rates must be measured with maximum errors of the order of 0.1 milliradian per second. Radar systems are generally the best for obtaining range and range rate information when the target range is of the order of miles or greater. Radar is not satisfactory for measuring angle and angle rates with the accuracies which are desired. For measurement of range rate, angle and angle rate when the target range is short, optical systems (either visible or infrared) are most desirable. Also, it is desirable to provide optical systems to supplement the radar ranging apparatus in the event that the rendezvous target employs radio frequency countermeasures. A relatively economical non-coherent type of radar apparatus will suffice for ranging at long ranges and can be advantageously supplemented by optical sensing systems for use when the target range is less than a few hundred feet. At short ranges, optical sensing systems provide angle and angle rate information with better accuracy. In addition, passive optical sensing systems have the advantage of affording a large power savings when used for search and acquisition of targets. Long range search by radar techniques notoriously requires high power apparatus and high consumption of electrical energy.

Accordingly, it is an object of the present invention to provide an improved sensing and control system for navigation and attitude control of spacecraft.

It is another object of the present invention to provide an improved target tracking system for rendezvous of space vehicles which is capable of measuring angle information and angle rates with improved accuracy.

It is a further object of the present invention to provide a passive optical tracking system for spacecraft rendezvous which is capable of providing range rate information.

While the present invention has many other possible applications in a variety of arts, as noted above, it may be most readily understood and appreciated by detailed consideration of one definite form which it takes when applied to another specific art in which it has particular utility. My invention is hereafter described with reference to one exemplary embodiment which is most suitable for target tracking fire control systems in armored vehicles such as tanks. It is to be understood that the salient features of my invention have a much broader utility than the specific example described in the following.

In one type of tank which is presently being utilized, the primary weapon or gun is azimuthally positionable by means of motors, either hydraulic or electric, which are geared to the turret ring. The gun elevation actuator normally consists of a hydraulic cylinder connected between the turret of the tank and the gun mount and controlled by either electric or hydraulic servo systems. Normally the gun position is stabilized or held with reference to a particular target during motion of the tank by means of gyroscopes which are connected in the feedback loops of the elevation control and azimuth control servomechanisms. Stabilized gun pointing systems, as just described, are plagued by a number of problems which may prevent the gun from being perfectly stabilized on the target. One problem is that the characteristics of the servo systems are frequently inadequate to maintain the gun accurately positioned on a particular target as the tank travels over a rough terrain. That is, it is desirable to prevent random motions of the vehicle from affecting or altering the gun position. Since the vehicle movements may be abrupt, this means that the servomechanisms are required to have high power handling capabilities. To minimize the required power ratings it is most desirable to provide target sensing and tracking systems which have the highest possible information rate and sensitivity to angular rates of motion between the target and the tank. That is, regardless of whether the tank is moving or the target is moving, it is essential that the target tracking system respond as quickly as possible to any change in the rate of angular motion of the target relative to the gun axis. Another problem encountered, particularly in tanks, is that such vehicles are subject to severe shock and vibration even under optimum operational conditions. The shock and vibration normally encountered dictate that electronic control systems be comprised of solid state circuits and that the mechanism for scanning the field of view be of rugged construction. It is preferable to avoid the use of vacuum tube image scanners such as Vidicon and Orthicon camera tubes and the like.

In view of the foregoing discussion, it is an additional object of my invention to provide an improved apparatus for automatically holding the gun of an armored vehicle on target and maintaining the hold regardless of vehicle and/or target motion.

It is a different object of my invention to provide a target sensing and relative motion detecting system having improved responsiveness to high values of the rate of change of relative motion.

Still another object of my invention is to provide an improved relative motion detecting system which employs infrared/optical sensing techniques.

It is a general object of my invention to provide an improved tank primary weapon gun pointing control system capable of significantly increasing hit probabilities.

It is another general object of my invention to provide an improved system of the type described which will automatically correct for translation and angular movement of the weapon carrying vehicle.

It is a still further object of my invention to provide a relatively low power consumption target tracking fire control system.

Briefly, the foregoing objects and features of my invention are fulfilled in a preferred embodiment by provision of a precision scanning means which is arranged to analyze or dissect an image of the field of view and which thereby generates a video signal for application to circuitry which is capable of comparing the video signal with a generally similar signal derived from a signal storage mechanism. A plurality of correlator devices are utilized to determine and electrically indicate whether or not the contemporary image of the field of view is identical to the image of the same field of view which has been stored from an earlier time. By incrementally comparing a lately derived train of video signals with a previously stored train of video signals it is possible to generate information signals indicative of change of position of a target object within the field of view or indicative of motion of the entire field of view relative to the viewing system. In a particular embodiment especially adapted for use with armored vehicles, three separate information signals are generated. The first is an azimuth position signal produced in response to lateral motion of the target object in the field of view and useful for automatically controlling the turret drive motors by way of conventional servoamplifiers to thereby maintain the primary gun trained on the moving target. The second signal which is generated is representative of elevational motion of the target object relative to the line of sight of the viewing system. This signal obviously may result from actual change in the elevation of the target or from pitching motion of the armored vehicle. The elevation error signal is applied to appropriate servo power amplifiers for continuously controlling the elevation of the primary gun in a manner to keep it effectively trained on the target object. The third signal generated in accordance with the invention is representative of apparent change in the size of the target object. Where the primary weapon and hence the optical viewing system is initially trained on a selected target by the tank captain or gunner, an image may be stored in which the image dimensions of the target provide some information concerning the range of the target. That image is compared with subsequent images of the same target to develop signals indicative of apparent change in target size and therefore providing information concerning changes in the range of the target. This range change or range rate signal preferably is used to control a servomechanism which drives a "zoom" lens in the optical imaging system to maintain optimum focusing of the target object at the image plane of the scanning apparatus. Additionally, the zoom lens drive mechanism may provide additional outputs to indicate the range or the range rate of the target object.

More specifically, in accordance with one particular arrangement, the scanning mechanism comprises a Nipkow scanning disc and an appropriate radiation sensor associated therewith for developing video signals representative of a detailed scanning of the image of interest. These video signals are stored and later compared with similarly derived signals corresponding to the same field of view. In accordance with certain aspects of the invention, storage of the earlier time image signal may be accomplished by means of conventional magnetic records or magnetostrictive delay lines or the like. In a preferred embodiment signal storage is accomplished by providing a plurality of magnetic recording tracks on one or more surfaces of the Nipkow scanning disc itself. This arrangement is particularly attractive in that it provides storage of the video signals in a manner such that when reproduced or played back from the scanning disc they are automatically synchronized with contemporaneous signals which are being developed by the scanning apparatus. This arrangement has the additional advantage that the magnetic tracks on the scanning disc can be used to provide a permanent or semi-permanent signal storage. By provision of long time image memory the correlation circuits can be arranged to monitor long term change in target position as well as to produce signals corresponding to the rate of change of the target position.

The foregoing and other objects of my invention will be more clearly apparent from the following description taken with the accompanying drawing, throughout which like reference characters indicate like parts, which drawing forms a part of this application and in which.

One exemplary embodiment of the present invention most suitable for use in armored vehicles is illustrated in FIGS. 1–5.

Figure 1:
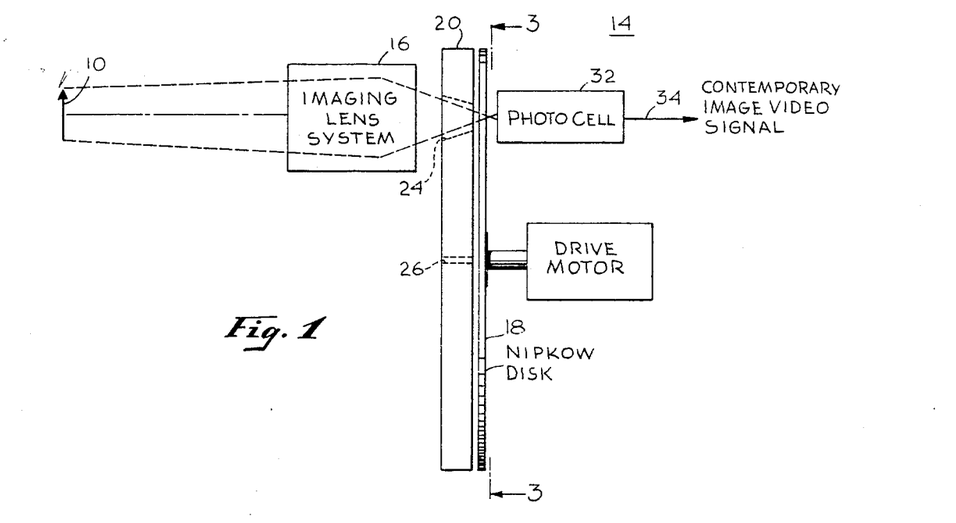
FIG. 1 is a diagrammatic illustration of an image scanning apparatus in accordance with my invention.

In the arrangement shown in FIG. 1 a selected object or target 10 is brought within the field of view of an image scanning assembly 14 by the act of the tank captain or gunner initially training the primary weapon of the tank on the target. When the image scanning assembly is in position to view the object 10, radiation emanating therefrom is collected by the conventional optical imaging system 16 and is focused through an aperture 24 in the scanner backing plate 20 to provide an image of the field of view substantially at the plane of a Nipkow scanning disc 18. Preferably the scanning disc 18 is a thin sheet of Mylar which is opaque except for the spirally arranged apertures 36 which are provided for incrementally scanning the optical image. The Mylar scanning disc 18 is mounted closely adjacent to the backing plate 20 so that it is maintained rigidly in the desired position by the Bernoulli effect; that is, in operation, air near the periphery of the disc 18 is thrown outwardly by centrifugal force thereby causing air to be drawn in through an aperture 26 in the backing plate 20 near the center of the disc 18. The resulting radial airflow, by virtue of the Bernoulli effect, causes the disc 18 to cling quite closely to the backing plate 20 with only a sufficient spacing therefrom to permit the continuous airflow. Since the Mylar disc has a relatively small mass, the optimum spacing of the disc 18 from the backing plate 20 is maintained even under severe shock or vibration conditions.

Figure 3:
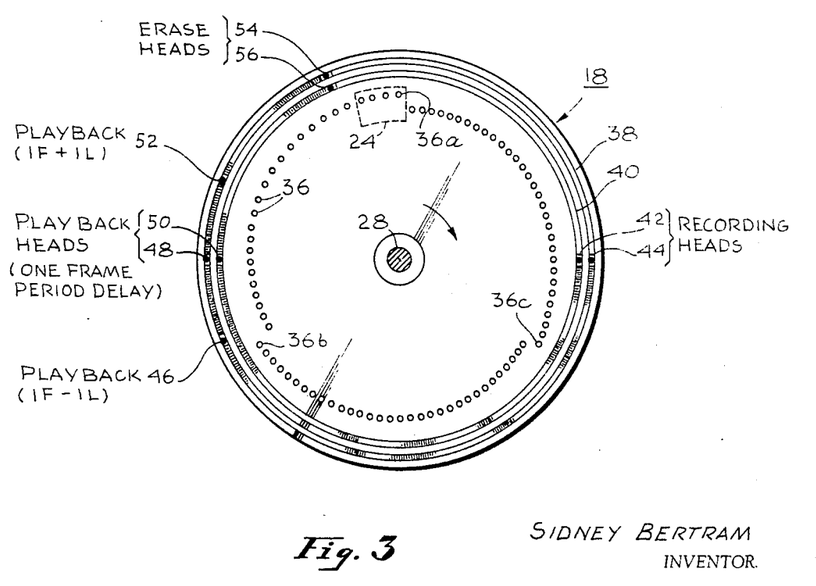
FIG. 3 is a sectional view of the scanner of FIG. 1 taken along the lines 3—3 of FIG. 1.

As best shown in FIG. 3, the scanning apertures 36 are arranged in a plurality of spirals on the scanning disc so that when the disc is rotated relative to the backing plate 20 the individual scanning apertures 36 provide a line by line scane of the image frame which is defined by the image window 24. Within an individual group corresponding to one scan cycle the scanning apertures 36 are displaced at successively smaller radial distances (proceeding counter-clockwise) from the center of the disc. When the disc 18 is rotated clockwise each scanning aperture 36 passes in turn across the image window 24 thereby transmitting light from successive lines of the field of view to the radiation detector 32. In one particular arrangement of the present invention the Nipkow scanning disc 18 is arranged to rotate at about 3600 r.p.m.. Preferably, the disc 18 has three spirals of scanning apertures so that scanning is accomplished at a rate of 180 frames per second and 2700 lines per second with a resolution of 15 lines per frame.

The radiation detector 32 may comprise a photomultiplier tube or a cadium sulphide photo cell followed by an appropriate amplifier. In accordance with broader aspects of the invention it should be understood that the radiation detector 32 is not necessarily a visible light responsive device but may, as desired, be an infrared detector or any of various known detectors for producing an electrical output signal in response to the particular radiation which emanates from the target object 10 in the particular case. From the foregoing it will be apparent that the Nipkow disc scanning apparatus 14 constitutes an image dissection means or scanning means for time sequentially permitting radiation from different elemental portions of the field of view to impinge upon the radiation detector 32 so that the detector produces video signals on line 34 which have different time portions respectively representative of the radiation emanating from different lateral portions of the field of view.

In accordance with a preferred embodiment of the invention there is additionally provided on at least one surface of the Mylar scanning disc 18 a plurality of substantially circular tracks or paths 38 and 40 of magnetizable material which may be used for magnetically recording and storing the video signals. The uses and advantages of the magnetic recording tracks 38 and 40 will become more apparent as consideration of the apparatus illustrated in FIG. 2 proceeds. Signals from the scanning apparatus of FIG. 1 are applied to the signal processing systems of the apparatus illustrated in FIG. 2 by means of an input video signal line 34. The input video signal is applied directly to a time delay means 66 and through an image signal storage mechanism 60 to a second time delay means 64. Intermittent or selective connection of the storage means 60 to the video signal line 34 is provided by a manually operable switch 58 which constitutes a means for updating the image information which is stored by the storage means 60. Storage means 60 may comprise any one of a variety of memory devices to which a train of signals can be applied by way of the updating switch 58 and which will store that train of signals and periodically reproduce the same until such time as the stored information is erased or replaced by new information. When the tank captain or gunner first trains the viewing system of FIG. 1 on a target he may simultaneously actuate the switch 58 to thereby store an image of the desired target and its immediate background in the storage means 60. During subsequent time periods the storage means 60 will reproduce the stored video signal on a repetitive basis and apply the same to delay line 64 and by way of conductor 68 to a first input of a correlator 76. Simultaneously, the delay means 64 slightly delays or phase shifts the stored image signal and applies the same by way of conductor 72 to a first input of another correlator 74. At the same time, a train of signals derived directly from the scanning mechanism of FIG. 1 and representative of the target as presently viewed is applied by way of video signal line 34 and conductor 70 to the second input of the correlator 74. Thus, the inputs to the first correlator 74 are a slightly delayed version of the original image which was viewed by the scanning mechanism 14 and a contemporaneous image of the target as it is presently being viewed by the scanning mechanism 14. If the present image of the target is identical in all respects to the original image of the target, the first correlator 74 will indicate approximate correspondence between the two signals applied thereto and will produce a nominal amplitude output signal at line 78 which is indicative of no change in the target image. Because of the delay provided by delay line 64 the two signals applied thereto are not precisely correspondent and synchronous; that is the contemporaneous train of signals from line 70 leads the stored signal by a slight time shift as provided by delay means 64. Accordingly, if during the interval since the original image was stored in storage means 60, the target object has shifted laterally relative to the axis of the optical system 16, particular components of the target will be scanned by each scanning aperture 36 at a slightly later time so that the train of signals at line 70 representative of those target components will be slightly later in time than they would have been if the target had not moved. Thus, if the target shifts to the right, for example, with respect to the axis of the optical system 16, the correlator 74 will indicate a higher correlation or correspondence between the contemporaneous signal and the stored signal and will produce a larger than normal output at the output line 78. If the target has shifted to the left relative to the axis of the optical viewing system, the signal at line 78 will be of smaller amplitude than normal. The correlator 76 operates in a manner precisely opposite to that of correlator 74; that is, the contemporary signal applied to correlator 76 is delayed slightly by delay line 66 and, accordingly, the correlator 76 sees a stored image from storage means 60 which appears to lead the contemporaneous signal in time. Accordingly, the correlator 76 produces a nominal output at line 80 when there is no time change in the position of the target relative to the axis of the optical system 16. If the target has shifted to the right relative to the optical axis, the contemporaneous image signals are delayed even more so that correlator 76 senses a decrease in the correspondence between the contemporaneous image signal train and the stored image signal train. If the target has shifted to the left, the contemporaneous image signal train as applied to delay line 66 will be earlier in time and the shift in target position will substantially offset the delay effect of delay line 66 so that the contemporaneous image signal at correlator 76 will be substantially in synchronism with the stored image signal from storage means 60. Accordingly, if the target has shifted to the left, correlator 76 will produce a larger than normal output at line 80.

A particular circuit which is preferably employed to perform the signal processing functions of correlators 74 and 76 is disclosed in detail in my copending United States patent application, Serial No. 199,797, filed June 4, 1962 (D-1988) and entitled "Automatic Stereomapping System." Since the correlator circuit, per se, is not the essence of the present invention, it is not disclosed in further detail herein. It is sufficient for present purposes to state that the preferred correlators 74 and 76 are circuits which individually constitute means to receive at first and second inputs a pair of signals $f(t)$ and $g(t)$, and to produce in response to those signals a single output signal of the form:

$$e_o = K \int_0^T ([f(t)+g(t)]^2 - [f(t)-g(t)]^2) dt$$

It can be shown that a correlation means for performing the above-described function is an apparatus which continuously derives the product of the time coincident instantaneous amplitudes of the signals $f(t)$ and $g(t)$ and which integrates those incremental products over the period $0 \to T$ so that the output signal or voltage is a measure of the degree of similarity or correlation between the two output signals over the time period T. The theory of multiplying correlators is considered, at length, in Truxal, J. G. Control Systems Synthesis (McGraw-Hill, 1955) pages 444–453 and reference may be had thereto for a more complete appreciation of the theory and operation of such circuits and devices. Essentially, the signal analyzing process defined by the equation set forth above is a time domain concept representing the following steps: (1) the second function $g(t)$ is time delayed by a time T; (2) the first given function $g(t-T)$; multiplied by the time delayed second function $g(t-T)$; and (3) an average is taken of the resulting product over a period which is allowed to become infinite (or in a practical case, over a period which is long compared to the period of the lowest frequency components of the signals $f(t)$ and $g(t)$.

Figure 2:
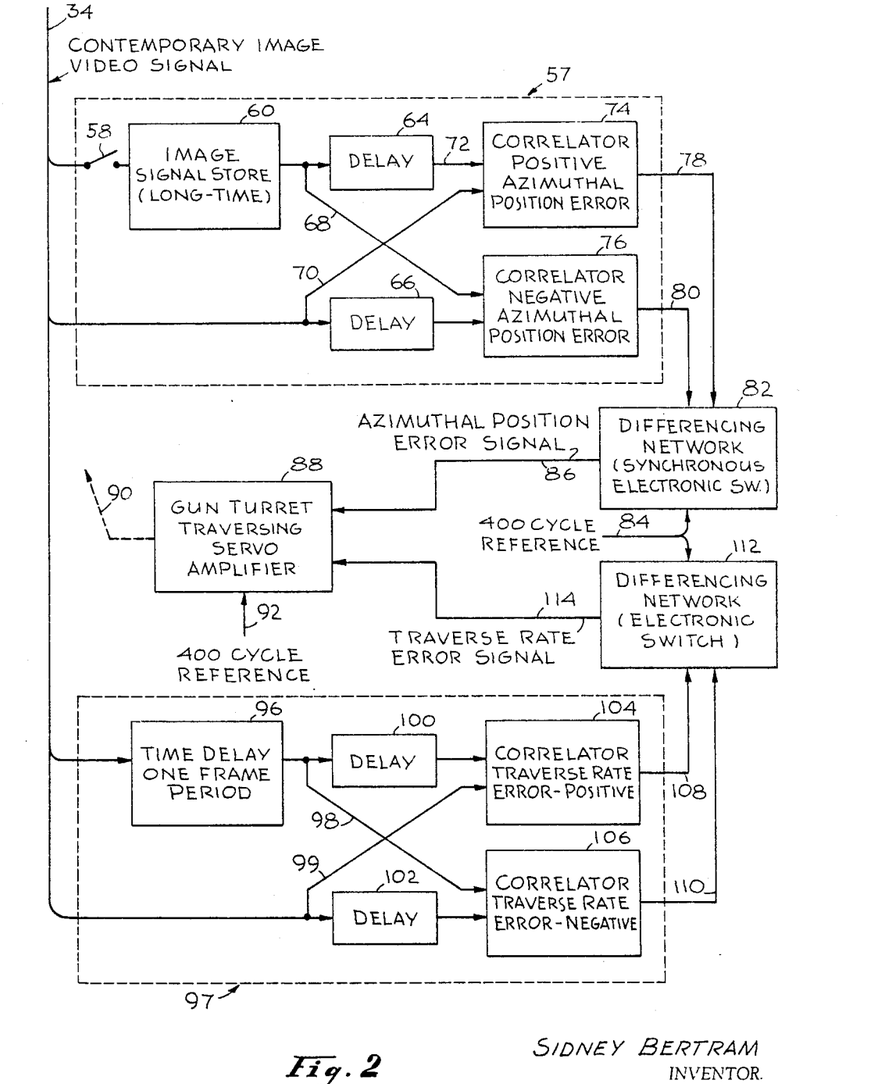
FIG. 2 is a block diagram representation of an azimuth position and traverse rate control system for automatically training the guns or other mechanisms of a tank or other vehicle on a selected target object.

In the foregoing discussion of the azimuth position error channel 57 of FIG. 2 the switch 58 was described as being a manually operable switch means which could be actuated by the tank commander at the time he initially positions the viewing system on a selected target. It is contemplated that the switch means 58 need not be simply a manually operable switch but may, if desired, comprise a mechanism for automatically and periodically erasing the image signal contained by the storage means 60 and replacing it with a fresh train of video signals representative of the field of view as presently being viewed by the scanning mechanism. While the concept of automatically updating the image which is stored by the storage means 60 may be advantageous in some cases, it should be considered with some caution. Specifically, to avoid drift of the target relative to the viewing system it is essential that the viewing system be held precisely on target during the time when the signal store 60 is being erased and updated. Thus, if the schematically illustrated switch means 58 is to comprise an automatic arrangement for updating the stored image signal it should be provided with lock-out circuits of an appropriate type (not shown) so that updating will not take place when there is an uncompensated dynamic motion of the target relative to the target follow system of FIG. 2. Specifically, if there is a finite azimuthal error signal at line 86 or a finite error in the traverse rate signal at line 114 the stored image updating switch means 58 should be locked out until those error signals are reduced to zero, either automatically or with the assistance of the operator.

Returning now to consideration of the azimuth error channel 57 of FIG. 2, the output signals from correlators 74 and 76 are applied by way of conductors 78 and 80 respectively to a differencing network 82 which preferably comprises an electronic switch which is synchronously actuated by a 400 cycle reference signal from line 84 and which operates to synchronously and alternatively connect the output conductor 86 to the input conductors 78 and 80. Accordingly, the differencing network 82 operates to provide, at the line 86, a 400 cycle signal having an amplitude which represents the magnitude of azimuthal error and having a phase relative to the 400 cycle reference signal which indicates the sign of the azimuthal error. The azimuthal position error signal at line 86 is applied to a conventional turret traversing servo-amplifier 88 which converts the same to an appropriate rotation of the gun turret as indicated by the mechanical coupling 90 of FIG. 2.

In summary, the azimuth position error channel 57 receives contemporaneous video signals from the video signal line 34 and compares the video signal components with a train of stored video signals from the storage means 60 in order to determine the degree of time coincidence of correlative elements of the video signals. In that manner, detection and measurement of the error or deviation of the present field of view from the original field of view represented by the long term stored image signal is accomplished. The resultant signal, as produced by differencing network 82, is fedback to the servo-amplifier 88 to dynamically control the angle to which the gun turret is trained. Preferably, the gun turret carries with it the optical system 16 and the scanner 14. Accordingly, this portion of the system of FIG. 2 forms a closed loop turret traversing servomechanism for azimuthally holding the primary gun of the tank on the originally selected target.

The rate error channel 97, as illustrated in the lower portion of FIG. 2, is generally similar to the azimuthal position error channel 57 as described heretofore. That is, the delay lines 100 and 102 may be substantially identical to the delay lines 64 and 66 and the correlator circuits 104 and 106 may be similar to the correlators 74 and 76. The train rate error channel 97 differs in that it does not use signals representative of the original image but rather uses stored signals representative of the immediately preceding frame scanned by the scanning mechanism. Specifically, the contemporary image video signal is applied by way of line 34 to a one-frame-period delay means 96 which simply stores the video signal for a time period corresponding to one complete scan period of the scanning mechanism 14. In the particular embodiment mentioned heretofore in which the Nipkow disc 18 rotates at 3600 r.p.m. and has three spirals of scanning apertures, the frame period is 1/180 second. Thus, in that particular embodiment the one frame period delay means 96 delays each video signal component for 1/180 second. In accordance with a preferred embodiment of the present invention the desired one frame period delay is achieved by applying the video signals to a recording head 42 which is positioned adjacent to the magnetic track 40 of the Nipkow disc as shown in FIG. 3. The signal so recorded on the magnetic track 40 is continuously played back by a playback head 50 positioned adjacent to the same magnetic track and preferably angularly spaced around the disc a distance equal to the angular spacing between the first aperture 36a of a first spiral of scanning apertures and the first aperture 36b of a second spiral of scanning apertures.

The "previous frame" signal from delay means 96 is applied through delay line 100 to a first input of correlator 104. Simultaneously, the "present frame" video signal from line 34 is applied by way of connection 99 to a second input of the correlator 104. Thus correlator 104 compares with the video signal representing the target as presently scanned with the video signal representing the target as scanned during the preceding frame. Delay line 100 provides a small time shift between the two signals so that correlator 104 will produce a normal output when the two frames are identical, a larger than normal output when the target is moving laterally to the right, and a smaller than normal output when the target is moving to the left. Correlator 106 operates in precisely the opposite manner to produce a larger than normal output when the target is moving to the left, and a smaller than normal output when the target is moving to the right. The output voltages from correlators 104 and 106 are applied by way of conductors 108 and 110 to a differencing network 112 which switches between the two at a 400 cycle rate to produce a traverse rate error signal at the line 114. This rate error signal is 400 cycle voltage having a phase relation relative to the 400 cycle reference which indicates the sign of the error in traverse rate and having an amplitude indicative of the magnitude of the error in the rate at which the gun turret is being traversed. The rate error signal from line 114 is applied to the servo-amplifier system 88 together with the position error signal from conductor 86 and assists in controlling the turret drive to hold the primary weapon trained on the target even in the presence of rapid changes in the azimuthal velocity of the target relative to the tank.

Figure 4:
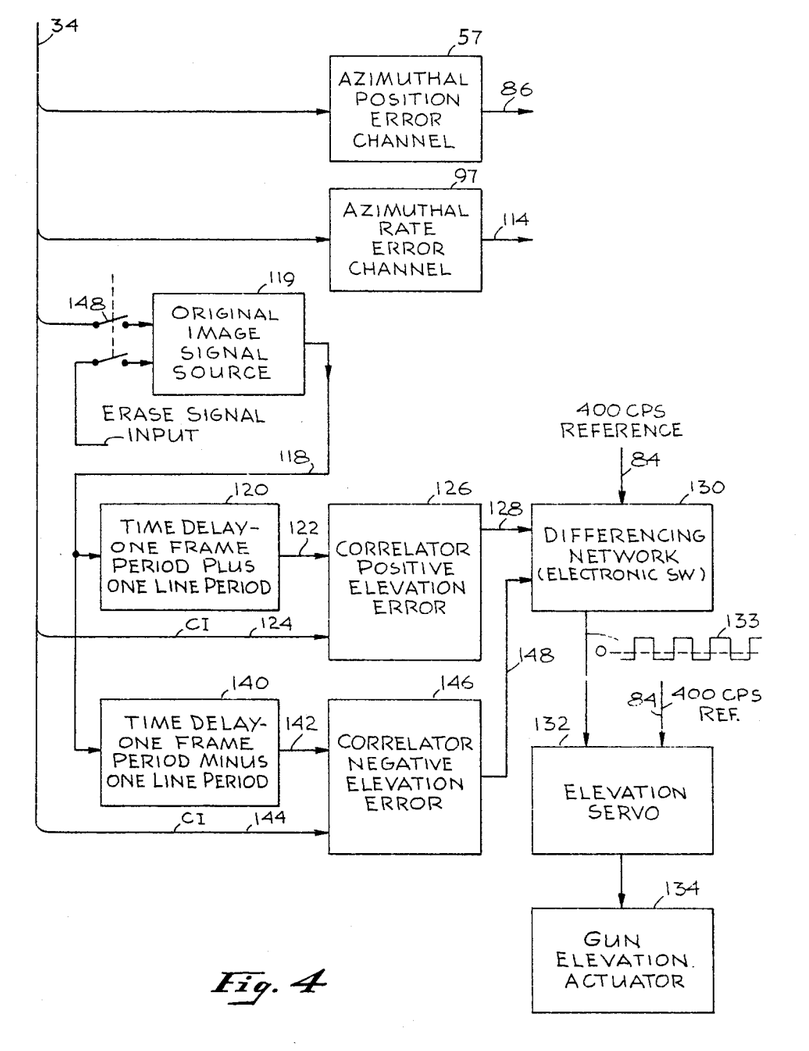
FIG. 4 is a block diagram representation of an elevation control system in accordance with the present invention.

In FIG. 4 there is shown an additional portion of the system of the present invention which operates to control the elevation of the primary weapon of the tank. In the case of spacecraft application this portion of the system may be used to control pitching of the spacecraft about the axis which is perpendicular to the viewing axis of the optical system 16 and parallel to the direction in which the scanning apertures 36 of the Nipkow disc scan across the window 24. As shown in FIG. 4, contemporary video signals derived from the scanning apparatus of FIG. 1 are applied to the azimuth position error channel 57 and to the azimuthal rate channel 97, which channels function to control the azimuth position of the gun turret as described heretofore with reference to FIG. 2. Additionally, the video signal on line 34 is applied through a double pole updating switch 148 to a signal storage means 119 for storing a train of video signals representative of the original image viewed by the scanner 14. As discussed heretofore in connection with FIG. 2, the original image signal store 119 preferably comprises one magnetic track 38 on the Nipkow disc to which signals are applied by means of a recording head 44. Spaced apart around the Nipkow disc and preferably secured in apertures in the backing plate 20 are the recording head 44, a pair of playback heads 46 and 52, and an erasing head 56.

When the updating switch 148 is closed, signals from video signal line 34 are applied to the recording head 44 and simultaneously an erasing signal applied through the second pole of the switch 148 energizes the erasing head 56 to remove any signal information previously stored in the magnetic track 38. After a complete train of signals representing one frame of the image scanned has been stored in the magnetic track 38, switch 148 is opened so that the stored signal train is retained on a semipermanent basis. As diagrammatically illustrated in FIG. 4, the output of the original image signal store 119 is connected to first and second time delay means 120 and 140. In the preferred arrangement, that diagrammatic "connection" is accomplished by the specific angular spacing between the playback heads 46 and 52 and the recording head 44. The playback head 46 is spaced from the recording head 44 an angular distance corresponding to one frame period less one line period. That is, the angular spacing between the recording head 44 and the playback head 46 is equal to a distance one intra-aperture spacing less than the angular distance between the first apertures 36a and 36b of a pair of aperture spirals. Similarly, the second playback head 52 is spaced from the recording head 44 an angular distance corresponding to one frame period plus one line period. Accordingly, the signal which is played back or reproduced by the playback head 52 represents a reproduction of the original image delayed by a time equal to one frame period minus one line period and the signal derived by the second playback hear 52 represents a reproduction of the original image delayed by a time equal to one frame period plus one line period. From the foregoing it will be appreciated that the video signal applied to the first input of first correlator 126 from delay means 120 is representative of original image plus a time delay of one line period. A contemporary image video signal is applied to the second input of the correlator 126 by way of line 124. Because of the one line period delay relation between the two signals applied to correlator 126, the correlator circuit compares line $n$ of the "present frame" with line $n-1$ of the "original image." As a result, correlator 126 will produce a nominal output at line 128 if there has been no change in the elevation of the target relative to the optical axis of the scanning apparatus 14; if there has been vertical movement of the target the correlator 126 will produce a greater than normal or lesser than normal output depending on the direction of the relative motion of the target. Specifically, if the target has moved upwardly relative to the optical axis of the system since the original image was stored, line $n-1$ of the present frame image will be similar to line $n$ of the original frame image. Accordingly, because of the one line period delay provided by delay means 120, the correlator 126 will produce a greater than normal output. Similarly, if the target has moved downwardly within the field of view, the correlator 126 would produce a lesser than normal output. The correlator 146 operates in conjunction with time delay means 140 to produce an output signal at 148 which varies with change in target elevation in a manner precisely opposed to the output signal from correlator 126. That is, when the target moves upwardly relative to the field of view, the output from correlator 126 increases and the output from correlator 146 decreases. The differencing network 130 preferably comprises an electronic switch identical to that of the differencing networks 82 and 112 of FIG. 2. A 400 cycle reference signal applied to network 130 by way of input line 84 synchronously switches the network 130 to alternately connect the correlators 126 and 146 to an elevation control servo-amplifier 132. The 400 cycle signal applied from network 130 to the elevation amplifier 132 is indicated by the numeral 133. It may be observed that the elevation control signal 133 is a 400 cycle chopped voltage wave whose 400 cycle component corresponds to the error in elevation of the look angle of the viewing system. That is, the signal 133 represents by amplitude and phase the vertical shift of the target relative to the axis of the optical system 16 during the time between the original frame and the present frame. The phase or polarity of the signal 133 relative to that of the 400 cycle reference signal indicates the polarity or sign of the elevation error (i.e., whether the target has moved upwardly or downwardly relative to the optical axis of the scanning apparatus 14). The elevation servo-amplifier 132 may be any one of a variety of conventional servomechanisms which are well known in the art and which are operative to utilize an input signal of the type indicated by the numeral 133 to dynamically control an electric or hydraulic drive motor or actuator 134 for governing the elevation of the primary weapon relative to the armored vehicle. Since the scanning apparatus 14 and the optical system 16 are preferably coupled, either mechanically or electrically, for movement with the primary weapon it will be appreciated that the circuitry of FIG. 4 constitutes a closed loop servo system for causing the primary weapon and the scanning apparatus 14 to continuously follow variations in the target elevation angle relative to the armored vehicle.

From consideration of FIG. 4 it may be seen that the azimuth signal channels 57 and 97 provide dynamic control of the system look angle in a first plane and that the elevation control circuitry of FIG. 4 provides dynamic control of the look angle in a second plane perpendicular to the first plane. Accordingly, the apparatus of the present invention, as illustrated in FIGS. 2 and 4, constitutes a target tracking apparatus capable of providing two-dimensional dynamic tracking or target follow operation. The azimuth channels 57 and 97 operate to sense and correct for any shift in the target position which is parallel to the direction of line scan of the scanning apparatus 14, and the elevation correlators 126 and 146 operate to sense and correct for any shift in target position in a direction perpendicular to the direction of line scan of the scanning apparatus 14. As stated heretofore, the elevation error signal 133 is preferably obtained by switching between the outputs of correlators 126 and 146 at 400 cycles per second which is normally the operating frequency of electrical servo-amplifiers such as the amplifier 132. When electrical servo-amplifiers are used, the differencing network 130 provides a convenient method of processing the error signals without the need for amplification of direct current signals. If, in a given application, the primary weapon is to be actuated by hydraulic servo-amplifiers, the signal from differencing network 130 should be applied through an appropriate alternating current amplifier to a high power level synchronous detector or rectifier (not shown) which will thereby provide a high power direct current control signal for application to the hydraulic servomechanism which dynamically positions the primary weapon.

Figure 5:
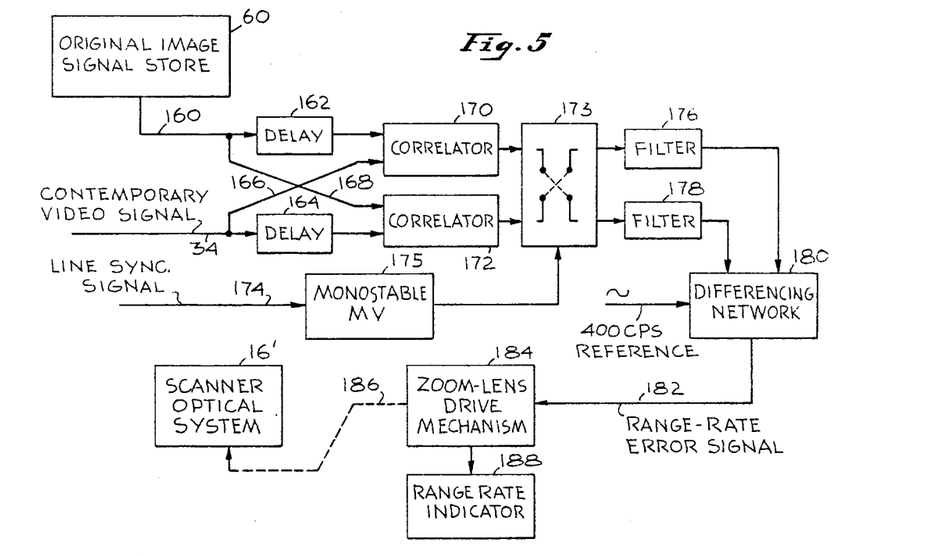
FIG. 5 is a block diagram illustration of an automatic image size adjustment circuit.

In FIG. 5 there is illustrated in block diagram form an auxiliary system which is preferably used to supplement the apparatus of FIGS. 2 and 4 in those applications where it is desirable to provide information concerning changes in the range of the target. It will be appreciated that once a particular target has been selected, variations in the size of the optical image of the target will provide information as to whether the target is closing on the viewing mechanism or receding from the same. That is, in the apparatus of FIG. 1, assuming that the optical system 16 had a fixed focal length, the image of the target 10 which is provided at the plane of the scanning disc 18 will normally increase in size as the range of the target decreases, and vice versa. If the initial range of an alien target is known, subsequent changes in the range may be summed to provide continuous information concerning the range of the target. Similarly, if the actual size of a particular target is known, its initial range may be determined by observation of the size of the target image and subsequent range information may be accurately maintained by integration of range rate signals. For example, in the application of the apparatus of the present invention to spacecraft rendezvous with a friendly rendezvous target, the actual dimensions of the rendezvous target will be known. Accordingly, measurement of the size of the target image will provide an accurate indication of the target range. By providing a system which continuously indicates the range rate, the space rendezvous operation may be substantially facilitated.

Figure 6:
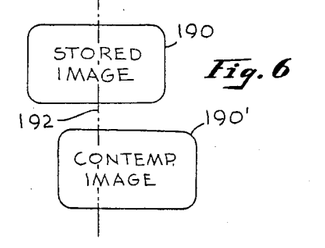
FIGS. 6, 7(a), 7(b), 8(a), 8(b), and 8(c) are functional diagrams useful in explaining the operation of the apparatus of FIG. 5.
Figure 7A:
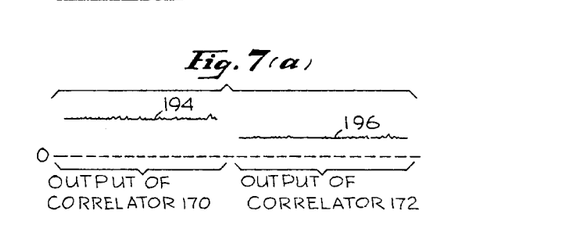
Figure 7B:
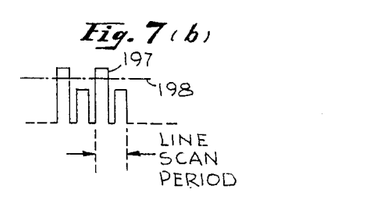

Referring specifically to FIG. 5, the range and range rate system there disclosed comprises a correlation channel which is generally similar to the correlation channels 57 and 97 of FIG. 2 and which includes correlator circuits 170 and 172 and short-time delay lines 162 and 164. Video signals representative of a stored image of the selected target are applied to the delay line 162 and to a first input of the second correlator 172 from a signal storage means 60 which, as stated heretofore, preferably constitutes the recording track 38 of the Nipkow disc. Specifically, the stored video signal which is applied to delay line 162 by way of conductor 160 in FIG. 5 may be obtained directly from playback head 48 of FIG. 3. A contemporaneous video signal obtained directly from the scanning apparatus 14 is applied to the circuitry of FIG. 5 by way of line 34 which is connected to the input of the second short-time delay line 164 and to the second input terminal of the correlator 170. Thus the signals applied to correlator 170 are a video signal representative of the present frame viewed by the scanning apparatus 14, and (at the first input of correlator 170) a train of video signals representative of the target as originally viewed by the scanning apparatus 14. The stored image signal is slightly delayed relative to the present frame video signal by the action of delay line 162. Accordingly, correlator 170 produces a normal output when the present frame is identical to the original image of the field of view, a larger than normal signal when the target has shifted to the right and a smaller than normal signal when the target has shifted to the left. Correlator 172 operates in precisely the opposite manner to provide a larger than normal signal when the target has shifted to the left and a smaller than normal signal when the target has shifted to the right. The foregoing is illustrated in FIGS. 6 and 7 wherein a target object, as represented in the original image, is designated by the numeral 190 and the same diagrammatically illustrated target object of the contemporary image is designated by the numeral 190'. The target images 190 and 190' are illustrated with reference to a line 192 which represents the vertical centerline of the frame viewed by the scanning apparatus 14. The line 192 represents the center of each line scan or, in the time domain, a time during each line scan which is one-half of a line scan cycle after the beginning of each line scan. By consideration of FIG. 6 and the correlation circuitry of FIG. 5, it may be seen that when the target has shifted to the right within the field of view relative to the axis of the optical system, correlator 170 will produce a larger than normal output as indicated at 194 in FIG. 7 and correlator 172 will produce a smaller than normal output as indicated by the numeral 196. However, in the system of FIG. 5 it is not desired to derive information concerning such a lateral shift in the target position. Rather, it is desired to nullify the effect of any such positional change and to detect changes in the apparent size of the object, i.e., changes in the size of the target image. To that end the apparatus of FIG. 5 is provided with an electronic reversing switch 173 controlled by a monostable multivibrator 175. The reversing switch 173 connects correlator 170 to filter 176 during the first half of each line scan and to filter 178 during the latter half of each line scan and additionally connects correlator 172 to filter 178 during the first half of each line scan and to the filter 176 during the latter portion of right hand half portion of each line scan. The action of reversing switch 173 is illustrated in FIG. 7b wherein the waveform 197 represents the signal applied to filter 176, for example. During each scan cycle, filter 176 is first connected to correlator 170 and later connected to correlator 172 so that the signal levels 194 and 196 are mixed at the input to filter 176. Accordingly, if there is a positional change of the target object 190, the effect of such position change on the correlators 170 and 172 will be nullified by the action of switch 173 and the signals applied to filters 176 and 178 are identical, both having an average magnitude as indicated by the dash line 198 in FIG. 7b. The differencing network 180 of FIG. 5 is identical in all respects to the similar networks 82 and 112 of FIG. 2 and operates to combine the output signals from filters 176 and 178 at a 400 cycle rate. Accordingly, when the filtered signals from filters 176 and 178 are applied through the network 180, the range rate error signal produced at line 182 will be zero even though there has been a lateral shift in the position of the target. It should be understood, of course, that the position error channels 57 and 97 of FIG. 2 will function in their normal manner as described heretofore to correct the above supposed position error.

Figure 8A:
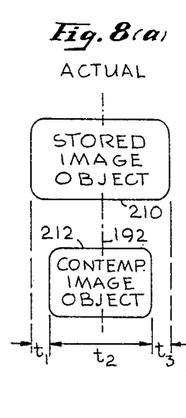
Figure 8B:
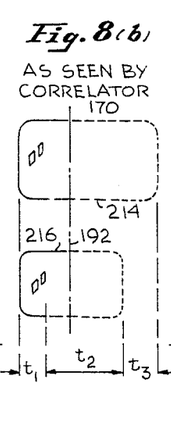
Figure 8C:
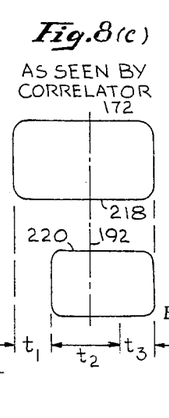

Now it is desirable to consider the operation of the apparatus of FIG. 5 when there is a change in the size of the target image resulting from a change in the range of the target. Such a change in the apparent size of the target is diagrammatically illustrated in FIG. 8 wherein the stored image of the target object is designated by the numeral 210 and a contemporary image of the same object 212 is shown as having a substantially smaller size. During the time $t_1$, representative of a first sub-portion of each line scan, the elementary components of the two separate signals arriving at correlator 170 are components corresponding to the left end portion of the target 210. Accordingly, assuming that the target has a reasonably uniform brightness or emissivity, those elementary components of the two separate signals will be relatively similar, and since the stored image signal is delayed by delay line 162 the correlator 170 will indicate a high correlation between the left hand end portions of the stored image and the contemporary image. This correlation is illustrated in FIG. 8b wherein the effect of delay line 162 is illustrated as shifting the stored image 214 of the target to the right relative to the contemporary image 216. The stored image and the contemporary image as seen by correlator 172 are indicated by the numerals 218 and 220 in FIG. 8c. By consideration of the conditions which exist at the time $t_1$ in FIGS. 8b and 8c, it may be appreciated that correlator 170 produces a high output during the first half of each line scan. Conversely, during the time $t_3$ the correlator 170 will be "seeing" the right hand end portion of the target in the stored signal delivered by delay line 162 but will be "seeing" a contemporary signal from line 166 which represents the background viewed by the scanner looking past the right end of the target object 216. Accordingly, during the time $t_3$ the signals do not correlate well and correlator 170 produces a relatively much smaller output. A similar analysis of FIG. 8c will show that the correlator 172 produces a lower than normal output during the first half of each line scan and a larger than normal output during the latter half of each line scan. The above described variation of the correlator output voltages during each line scan is exploited by the system of FIG. 5 as follows: reversing switch 173 connects the output of correlator 170 to filter 176 during the first half of each line scan and to filter 178 during each latter half scan. Conversely, correlator 172 is connected to filter 178 during the first half scan and to filter 176 during the second half of each line scan. Assuming that the target is receding from the scanning apparatus 14 so that the size of the target image is decreasing as illustrated in FIG. 8, the result is that filter 176 continuously produces a larger output than filter 178. The relative magnitudes of the signals from filters 176 and 178 provide an indication that the contemporary target image is smaller than the stored target image. Accordingly, increasing target range is indicated by a 400 cycle output from the differencing network 180 which has an amplitude and phase representative of the change in the range of the target since the original image was stored in the signal storage means 60. Decreasing target range produces an output from network 180 which is 180° out of phase relative to the 400 cycle reference signal and having an alternating current component or amplitude representative of the amount by which the target has closed on the scanning apparatus 14.

In accordance with a preferred embodiment of the invention, the range error indicative signal from differencing network 180 is applied to a mechanism 184 for dynamically driving a "zoom" lens or other variable focal length optical means 16' which is provided as a part of the optical system 16 of the apparatus of FIG. 1. The zoom lens drive mechanism 184 may comprise a conventional arrangement in which an electric motor for driving the optical elements by means of a mechanical coupling 186 is controlled by a conventional servo-amplifier which is fed with an input signal from line 182. Additionally, in those applications where it is desired to indicate range and range rate, an appropriate integrating counter or indicator 188 may be coupled to the zoom lens drive mechanism 184.

In the system of FIG. 5 it is essential that the connection of correlators 170 and 172 to filters 176 and 178 be reversed at the midpoint of each line scan as indicated by the dash line 192 in FIGS. 6 and 8. The switching action is accomplished by monostable multivibrator 175 which operates at the line scan frequency and which is provided with a synchronizing or triggering signal from input line 174. The line sync signal at 174 is similar to the end-of-the-line signal or horizontal synchronizing signal which is conventionally incorporated in television signal wave forms. Such a signal may be obtained from the scanning apparatus of FIG. 4 by providing a plurality of auxiliary apertures in the scanning disc corresponding to the number of spirals of scanning apertures and by providing a lamp and photo tube (not shown) for developing a synchronizing pulse at times corresponding to the center of each line scan, or by use of an auxiliary magnetic track on the scanning disc 18.

While the present invention has been shown in one form only, it will be obvious to those skilled in the art that it is not so limited but is susceptible of various changes and modifications without departing from the spirit and scope thereof.

The embodiments of the invention in which an exclusive property or privilege is claimed are defined as follows:

1. In an automatic gun pointing system for armored vehicles:

angularly positionable imaging means for providing an electromagnetic radiation image of a field of view which includes a selected target-object;

image scanning means for time sequentially scanning incremental portions of said image on a line-by-line basis to develop a video signal which includes different time sequential portions corresponding respectively to the radiation intensity at different longitudinally successive increments of each successive line;

information storage means for storing a portion of said video signal representative of at least one complete scanning of said field of view;

readout means for reproducing the stored video signal from said storage means after a time corresponding to at least one complete scanning cycle;

first and second signal multiplying correlators each having first and second input circuits and an output circuit;

first and second time delay means for individually providing substantially equal signal delay times corresponding to a small fraction of one scanning cycle;

means coupled to said readout means for applying the stored video signal directly to the first input circuit of said second correlator and by way of said first time delay means to the first input circuit of said first correlator;

means coupled to said scanning means for applying a contemporary image video signal directly to the second input circuit of said first correlator and by way of said second time delay means to the second input circuit of said second correlator;

means for alternately sampling the signals produced by said first and second correlators to develop an error signal representative of transverse motion of said target-object relative to the line of sight of said imaging means;

and means responsive to said error signal for controlling the angular position of said imaging means in a manner to hold said target object within the field of view.

2. An automatic gun pointing system in accordance with claim 1 in which:

said image scanning means includes a photodetector and a rotating Nipkow disc having a plurality of apertures for time sequentially permitting radiation from different portions of the field of view to impinge on said photodetector, and in which said information storage means comprises at least one substantially circular track of magnetic recording material disposed on one surface of said disc, and at least one recording head and one playback head positioned adjacent said track, with the recording head being selectively operable to apply video signals from said scanning means to said track and with the playback head being positioned and arranged to repetitively reproduce said video signals at subsequent times substantially equal to integral multiples of the image scanning period of said Nipkow disc.

3. In combination:
optical means for providing a radiation image of a selected field of view;
precision scanning means including a Nipkow disc disposed substantially in the plane of said image for time sequentially scanning of said image on a line-by-line basis to derive a video signal having different time sequential portions which are respectively representative of the radiation intensity at different longitudinally successive increments of each successive line of a plurality of time sequentially scanned elemental line portions of said image;
means for storing a train of said video signals representative of one complete image scan cycle;
signal multiplying correlation means coupled to said storing means and to said scanning means for incrementally comparing a later derived train of signals from said scanning means with the stored train of signals to produce an error signal representative of transverse motion of objects within said field of view relative to the optical axis of said optical means;
and means for utilizing said error signal to control the look-angle of said optical means.

4. Optical means for providing an image of a selected field of view;
a scanning mechanism including a Nipkow disc and a photodetector positioned to receive incident light which is passed by the Nipkow disc for developing a video signal which includes different time sequential signal portions corresponding respectively to the radiation intensity at different longitudinally successive increments of each successive line of a plurality of time sequentially scanned elemental line portions of said image; and
a signal correlation channel coupled to said photodetector for producing output signals representative of time function variations in the relative position of objects within said field of view, with said channel including a long-term signal storage means for providing a reference video signal representative of a previously existing image against which video signals corresponding to a present image may be compared.

5. The apparatus of claim 4 in which said signal storage means comprises a substantially circular track of magnetic recording medium supported on a surface of said Nipkow disc.

6. Optical means for providing an image of a selected field of view;
a scanning mechanism including a Nipkow disc and a photodetector positioned to receive incident light which is passed by the Nipkow disc for developing a video signal which includes different time spaced portions corresponding to different elemental areas of said image; and
a signal multiplying correlation channel coupled to said photodetector for utilizing said video signal to develop an information signal indicative of the rate of change of angular position of a selected image-object relative to said field of view; with said channel including a long-term signal storage means for providing a reference video signal representative of a previously existing image against which video signals corresponding to a present image are compared.

7. The apparatus of claim 6 in which said signal storage means comprises a substantially circular track of magnetic recording medium supported on a surface of said Nipkow disc.

8. In combination:
Optical means for providing an image of a selected field of view;
a scanning mechanism including a Nipkow disc and a photodetector positioned to receive incident light which is passed by the Nipkow disc for developing a video signal which includes different time sequential signal portions corresponding respectively to the radiation intensity at different longitudinally successive increments of each successive line of a plurality of time sequentially scanned elemental line portions of said image; and
a signal correlation channel including multiplication type correlation means coupled to said photodetector for utilizing said video signal to develop an information bearing signal indicative of time-function variations in the apparent size of a selected image-object within said field of view, with said channel including a long-term signal storage means for providing a reference video signal representative of a previously existing image against which video signals corresponding to a present image are correlated.

9. An automatic target tracking system in accordance with claim 8 in which said optical means comprises control means for variably controlling the magnification factor thereof, and means responsive to said information bearing signal for dynamically driving said control means in a manner to stabilize the apparent image size of a selected target-object within said field of view.

10. In an automatic target tracking system:
means for providing a radiation image of a selected field of view;
scanning means for time sequentially scanning said image on a line-by-line basis to derive a video signal having different time sequential portions which are respectively representative of the radiation intensity at different longitudinally successive increments of the elemental line portions of said image;
means for storing a train of said video signals representative of one complete image scan cycle;
signal multiplying correlation means for incrementally comparing a later derived train of signals from said scanning means with the stored train of signals to produce an error signal representative of motion of objects within said field of view relative to the optical axis of said optical means; and
means for utilizing said error signal to control the look-angle of said optical means.

11. An automatic target tracking system for use in spacecraft and the like, comprising:
angularly positionable imaging means for providing an electromagnetic radiation image of a field which includes a selected target-object;
image scanning means for time sequentially scanning said image on a line-by-line basis to derive a video signal which includes different time sequential signal portions corresponding respectively to the radiation intensity at different longitudinally successive increments of each successive line of a plurality of time sequentially scanned elemental line portions of said image;
information storage means for storing a portion of said video signal representative of at least one complete scanning of said field;
readout means for reproducing the stored video signal after a time corresponding to at least one complete scanning cycle;
first and second signal multiplying correlators each having first and second input circuits and an output circuit;

first and second time delay means for individually providing signal delay times corresponding to a small fraction of one scanning cycle;

means for applying the stored video signal directly to the first input circuit of said second correlator and by way of said first time delay means to the first input circuit of said first correlator;

means for applying a contemporary image video signal directly to the second input circuit of said first correlator and by way of said second time delay means to the second input circuit of said second correlator; and means for alternately sampling the signals produced by said first and second correlators to develop an alternating current error signal representative of motion of said target-object relative to the line of sight of said imaging means.

12. An automatic target tracking system for use in spacecraft and the like, comprising:

angularly positionable imaging means for providing an electromagnetic radiation image of a field which includes a selected target-object;

image scanning means for time sequentially scanning said image on a line-by-line basis to derive a video signal which includes different time sequential signal portions corresponding respectively to the radiation intensity at different longitudinally successive increments of each successive line of a plurality of time sequentially scanned elemental line portions of said image;

signal storage means for storing a portion of said video signal corresponding to at least one complete scanning of said image;

target position signal generating means, coupled to receive signals representative of a previously existing image from said storage means and signals representative of a currently existing image from said scanning means, and including first and second signal multiplying correlation circuits and first and second time delay circuits;

means for applying the stored video signal directly to a first input circuit of said second correlation circuit and by way of said first time delay means to a first input circuit of said first correlation circuit;

means for applying a contemporary image video signal directly to a second input circuit of said first correlation circuit and by way of said second time delay means to a second input circuit of said second correlation circuit; and means for alternately sampling the signals produced by said first and second correlation circuits to develop an alternating current error signal representative of motion of said target-object relative to the line of sight of said imaging means.

13. An automatic target tracking system in accordance with claim 12 in which each of said correlation circuits comprises a circuit arrangement for providing multiplication and integration substantially in accordance with the relationship:

$$e_0 = \frac{K}{T}\int_0^T f(t)g(t)dt$$

wherein $e_0$ is the output signal of the correlation circuit, K is an arbitrary constant, and $f(t)$ and $g(t)$ respectively represent the video signal corresponding to a previously existing image and the video signal corresponding to a currently existing image.

References Cited by the Examiner

UNITED STATES PATENTS 2,989,891 6/1961 Rockafellow ___________ 88—1
3,099,748 7/1963 Weiss _____________ 250—203

RALPH G. NILSON, *Primary Examiner.*

WALTER STOLWEIN, *Examiner.*

J. D. WALL, *Assistant Examiner.*